United States Patent [19]

Thompson et al.

[11] Patent Number: 4,761,229
[45] Date of Patent: Aug. 2, 1988

[54] MULTI-LEAF MEMBRANE MODULE

[76] Inventors: John A. Thompson, 581 Zone Street, Wyoming, Ontario, Canada, N0N 1T0; Medi M. Hafez, 3528 Sessions Dr., Baton Rouge, La. 70816

[21] Appl. No.: 64,383

[22] Filed: Jun. 22, 1987

[51] Int. Cl.$^4$ .............................................. B01D 13/00
[52] U.S. Cl. .................. 210/321.82; 210/450
[58] Field of Search .................. 210/346, 34.82, 323.2, 210/450

[56] References Cited

U.S. PATENT DOCUMENTS

| | | | |
|---|---|---|---|
| T867,005 | 10/1969 | Ulmschneider et al. | 210/321 |
| 3,367,504 | 2/1968 | Westmoreland | 210/321 |
| 3,397,790 | 8/1968 | Newby et al. | 210/321 |
| 3,417,870 | 12/1968 | Bray | 210/321 |
| 3,494,468 | 2/1970 | Kohl | 210/321.82 |
| 3,522,885 | 8/1970 | Lavender et al. | 210/321 |
| 3,565,258 | 2/1971 | Lavender et al. | 210/321 |
| 3,701,431 | 10/1972 | Brown et al. | 210/321 |
| 3,705,652 | 12/1972 | Russmann et al. | 210/321 |
| 3,768,660 | 10/1973 | Block | 210/321 |
| 3,786,925 | 1/1974 | Block et al. | 210/321 |
| 3,788,482 | 1/1974 | Markley | 210/321 |
| 3,864,265 | 2/1975 | Markley | 210/321 |
| 3,979,297 | 9/1976 | Bardin et al. | 210/232 |
| 4,009,107 | 2/1977 | Miller et al. | 210/321 |
| 4,009,108 | 2/1977 | Miller et al. | 210/321 |
| 4,019,988 | 4/1977 | Ziegler | 210/494 |
| 4,066,553 | 1/1978 | Bardonnet et al. | 210/321 |
| 4,128,479 | 12/1978 | Malchesky | 210/321 |
| 4,163,721 | 8/1979 | Lobdell | 210/232 |

FOREIGN PATENT DOCUMENTS

| | | |
|---|---|---|
| 3028398 | 2/1982 | Fed. Rep. of Germany . |
| 3141388 | 6/1983 | Fed. Rep. of Germany . |
| 9035194 | 10/1979 | Japan . |
| 2001867 | 2/1979 | United Kingdom . |

Primary Examiner—Frank Spear

[57] ABSTRACT

Described is a membrane apparatus having particular application in hydrocarbon processes, such as separating ketone dewaxing solvent from a hydrocarbon process stream. The apparatus contains a pressure resistant compartment containing flattened tubular membranes in a parallel stack arrangement separated by retentate spacers. Internally each tube contains permeate spacers for solvent outflow which permeate spacers extend the full length of the tubular membrane. The end of the tubes are not separated by retentate spacers and are clamped together such that solvent exits via the permeate spacers, while the clamping assembly design prevents the cocurrent exit of solution from the high pressure compartment at the solvent inlet location.

3 Claims, 2 Drawing Sheets

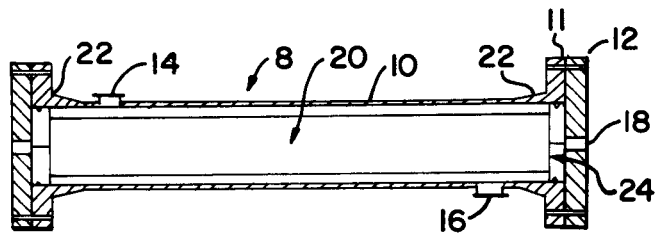
FIG. 3
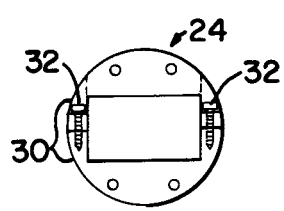
FIG. 4
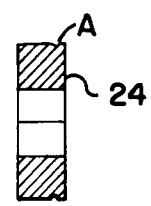
FIG. 5
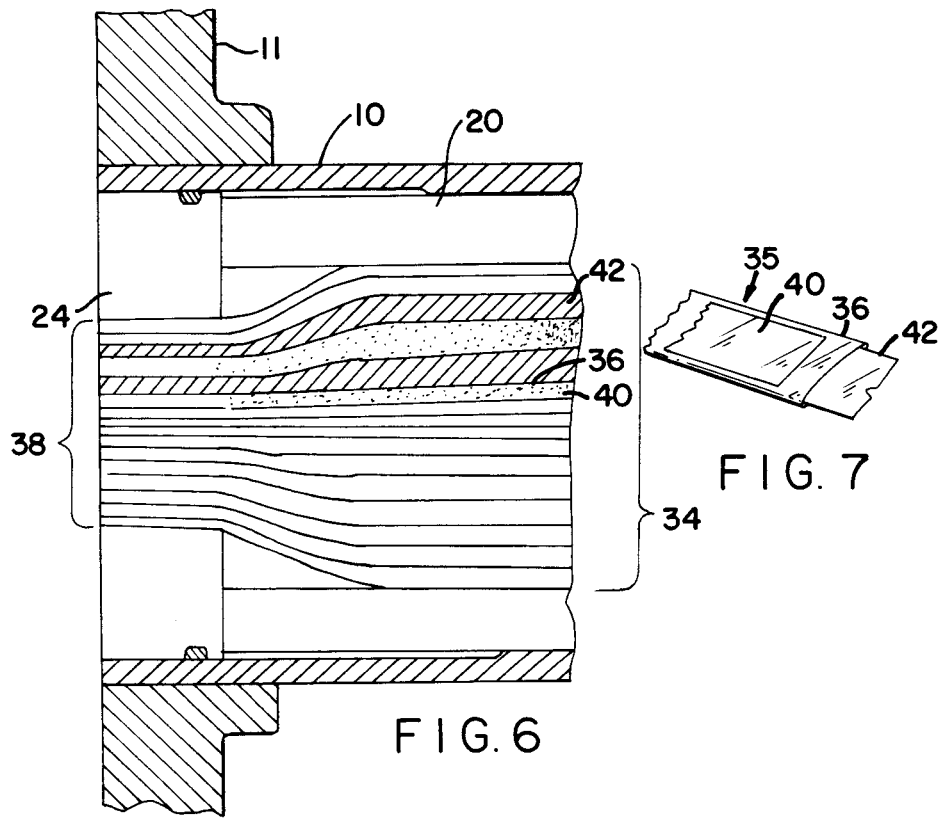
FIG. 6
FIG. 7

MULTI-LEAF MEMBRANE MODULE

BACKGROUND OF THE INVENTION

1. Field of the Invention

This invention relates to a novel membrane apparatus design. The apparatus is useful in producing permeable membrane elements for use in separating mixtures into various components under various separation conditions such as reverse osmosis, ultrafiltration dialysis, pervaporation or perstraction conditions. The design facilitates fabrication of membrane elements without the use of adhesives for use in the processing of viscous systems, especially of mixtures of organic liquids, at elevated temperatures and/or pressures or under vacuum (as in pervaporation).

2. Prior Art

Semipermeable membrane elements for industrial uses can be assembled in four different configurations: plate and frame (P and F), tubular (T), spiral wound (SW) and hollow fiber (HF). Most commercial units today utilize spiral wound or hollow fiber configurations which provide large membrane packing density (surface area per unit volume). The plate and frame and tubular designs have lower packing densities and are, therefore, used in special applications. The hollow fiber design has very high packing density but may be limited by high pressure drops and uneven flow distribution.

These systems have operating pressure limitations. For example, spiral wound and hollow fiber designs can be operated at about 500-1000 psig pressure in reverse osmosis applications and at lower pressures (50-100 psig) in ultrafiltration applications, while the tubular and plate and frame designs are normally limited to 10-100 psig operating pressures.

The standard spiral wound design is suitable for many applications but requires the use of an adhesive. Because adhesives are relied upon to make the numerous membrane-to-membrane and membrane-to-permeate tube seals, it is very important to maintain strong bond throughout the element's life. If seals weaken, leakage occurs and the element fails.

As many adhesives soften (swell) or dissolve in organic liquids, particularly at high temperatures, it is desirable to minimize or eliminate their use in designs of units to be used for organic systems. Some references briefly disclose means to avoid the use of glue by clamping devices, pressure plates, etc. These include U.S. Pat. No. 4,019,988, U.S. Pat. No. 4,009,107; U.S. Pat. No. 3,768,660; U.S. Pat. No. 3,786,925, U.S. Pat. No. 3,705,652, U.S. Pat. No. 3,979,297, U.S. Pat. No. 3,397,790, U.S. Pat. No. 3,367,504, U.S. Pat. No. 3,417,870, and U.S. Pat. No. 4,009,108.

In addition to the four main designs described above there are several other membrane element designs which have been described in the art and are extensively used, especially in dialysis and hemodialysis. For example, U.S. Pat. No. 3,701,431 describes such a design which can be operated at high pressure and in which membrane sheets are clamped together with an interposed spacer sheet to form a tube. Multiple tubes can be arranged to form the element.

Japanese Patent No. J79035-194 describes an osmotic filtration membrane device comprising a flattened semipermeable membrane tube with a flat-plate spacer located in the tube. The tube is corrugated with a number of spacers, each being disposed between the adjacent turns of the corrugated tube. The liquid enters into the tube and the filtered liquid discharges from the hollow space between the tube turns.

German Patent No. DE 3028-398 discloses an ultrafiltration unit for biological fluids which has rectangular semipermeable membranes stacked in pairs with spacers, in which the edges are sealed by embedding in a cured resin, such as epoxy. The stack is covered with a pressure plate to maintain proper spacing.

German Patent No. De 3141388 discloses an ultrafiltration unit being a small sterile filtration unit for medicine or laboratory use, having microporous bags with open ends fixed in a plastic disk.

GB Pat. No. 2,001,867 describes a disposable hemodialyzer with flattened membrane tubes in which blood passes successively over two groups of tubes which are stacked in parallel within a housing in which the ends of the tubes are embedded in cured plastic. This design is suitable for dialysis having a pressure limitation fixed by the dialysis mechanism of 15 psi.

The following references also disclose similar dialysis devices: Defensive Publication No. T867005; U.S. Pat. No. 3,522,885, U.S. Pat. No. 3,565,258, U.S. Pat. No. 4,128,479, U.S. Pat. No. 3,864,265, U.S. Pat. No. 4,066,553, and U.S. Pat. No. 4,163,721.

What is desired is a membrane apparatus possessing three main characteristics: (1) suitability for use with organic systems which may also be viscous over a wide range of operating temperatures, (2) large membrane packing density, and (3) and will operate at high pressures. Specifically desired in an apparatus which will operate in the pressure range required for ultrafiltration and reverse osmosis, about 10-1000 psig and will operate at a range of temperatures from about 20° C. to 200° C. and higher, in the presence of organic systems that may have a viscosity an order of magnitude higher than that of water.

SUMMARY OF THE INVENTION

An apparatus has been designed, constructed and tested which comprises a stack of flattened semipermeable tubular membranes in a pressure resistant cartridge module. The tubular membranes contain (disposed therein) permeate spacers which extend the full length of the tubular membranes. The tubular membranes are separated by retentate/feed spacers which do not extend the full length of said tubular membranes. The open ends of said tubes are clamped, forming membrane-to-membrane seals which are not separated by retentate/feed spacers, such that permeate (but not feed/retentate) is allowed to flow out of the ends of the tubes through the permeate spacers. This multiple layer sandwich of tubular membrane, within which are permeate spacers, and which membranes are separated by retentate spacers, is enclosed within a pressure resistant cartridge.

The membrane separation apparatus will be useful in any of the separation processes familiar to those skilled in the art, e.g. reverse osmosis, ultrafiltration, dialysis, pervaporation, perstraction, etc., especially those employing elevated temperature and/or pressure, be that an applied pressure or vacuum. Thus the apparatus will be especially useful in reverse osmosis, ultrafiltration, pervaporation and perstraction. Further, any type of mixture can be separated using this apparatus but, because of its construction which does not depend on the use of adhesives it will find special utility in separating mixtures of organic materials (be they liquids or gases).

The apparatus was shown effective in the high pressure process of separating organic liquid streams in a reverse osmosis process.

This design has several advantages over current commercial designs, particularly the spiral wound membrane module. The packing density of the instant apparatus is 270 to 340 square feed per cubic foot, versus 200 to about 250 for the comparative spiral would membrane of similar length and diameter. There is no adhesive required for membrane sealing along the edges of the stack and any other joints or seals only require clamping and optionally a small gasket seal around the clamping assembly. Thus, since the structural elements of the cartridge module may be made of any convenient material such as metal, plastic, molded resins, reinforced fiberglass etc. any membrane to structural element joints can be produced simply by clamping, formulation of a specific adhesive not being necessary. The pressure and/or temperature ratings are limited only by the pipe casing, the membrane and non-adhesive seal material.

By this invention there is provided an apparatus for separating a feed mixture into a permeate stream and a retentate stream comprising:

(a) a housing, having means for feed mixture inlet and retentate outlet and permeate outlet;

(b) a perssure resistant compartment having feed inlet and retentate outlet in register with the corresponding feed inlet and retentate outlet of the housing, said pressure resistant compartment being disposed within said housing, and being capable of withstanding pressures, either applied pressure or vacuum.

(c) plurality of flat or flattenable tubular semipermeable membranes, permeable to said solvent but not to the solute of said solution, arranged in a parallel stack arrangement, and separated individually by retentate/feed spacers, which do not extend all the way to the open ends of the tubular membranes, each tubular membrane internally containing a permeate spacer which does extend all the way to the open end of said membrane, each tube thus being open at both ends but not separated by the feed spacer at the ends, said feed spacers and tubular membranes containing the permeate spacers being alternately longitudinally layered to form a stack disposed inside said pressure resistant compartment;

(d) clamping means to seal the ends of the membrane stack under pressure and to prevent the feed from exiting the pressure resistant compartment through the membrane envelope layers at the permeate outlet ends, the sealing means longitudinally positioning and maintaining the tubular membranes stack in the compartment by clamping the tubular open ends in the arrangement thereby forming membrane-to-membrane seals, such that during operation the permeate permeating through the membranes exits internally from the membranes envelope via the permeate spacer into the permeate outlet, while retentate exist via the retentate outlet.

Preferably, the invention is directed to a high pressure membrane cartridge module comprising:

(a) plurality of flat or flattenable tubular semipermeable membranes, selectively permeable to one component of the feed arranged in a parallel stack arrangement, and separated individually by retentate/feed spacers, which do not extend all the way to the open ends of the tubular membranes, each tubular membrane internally containing a permeate spacer which does extend all the way to the open end of said membrane, each tube thus being open at both ends but not separated by the feed spacer at the ends, and being longitudinally layered inside said cartridge module;

(b) mechanical clamping device to seal the ends of the membrane stack under pressure and to prevent the feed from exiting the cartridge module through the membrane envelope layers at the permeate outlet ends, the sealing device longitudinally positioning and maintaining the tubular membranes stack in the module by clamping the tubular open ends in the arrangement thereby forming membrane-to-membrane seals, such that during operation the solvent permeating through the membranes exits internally from the membranes envelope via the permeate spacer into the permeate outlet.

As an alternative, the ends of the membrane stack can be mechanically clamped or taped to induce membrane-to-membrane contact seals, the balance of the length of the membrane stack then being wrapped in tape and the tape-wrapped assembly inserted into a mold form into which is poured a thermo-plastic or resin compound, thereby forming an integral module cartridge. The edges of the cartridge are trimmed, thereby exposing the end edges of the membrane stack. Oppositely placed feed entrance and retentate exit access openings are either cast or cut into the body of the module and the tape over the membrane stack at those access openings is removed so as not to restrict or block access of the feed to the membrane stack or prevent exit of the retentate from the membrane stack.

BRIEF DESCRIPTION OF THE FIGURES

FIG. 3 is a cross-sectional longitudinal view of the total assembly, showing the high pressure module assembly positioned inside of the total assembly. Shown also are the "O" rings in the high pressure compartment assembly which separate the high pressure feed zone from the low pressure permeate zone of the module in the interior of the assembly.

FIG. 4 is an end view of the clamping cover assembly showing the top and bottom portions which fit together to form the square clamping space for the tubular ends of the membrane stack.

FIG. 5 is a side view of the clamping cover assembly of FIG. 4.

FIG. 6 is a side view of the clamped tube assembly with the membrane stack positioned inside of the high pressure compartment. Shown also are the pressure housing, the high pressure compartment assembly, the stack assembly with the tubular membranes as separated by the permeate spacer elements.

FIG. 7 is a top view showing the positional relationship between a flattened tubular semipermeable membrane, its full length internal permeate spacer, and the shorter external retentate spacer.

DETAILED DESCRIPTION OF THE INVENTION AND PREFERRED EMBODIMENTS

The apparatus of the invention can be understood and appreciated by one skilled in the art by referring to the individual elements in the above-described Figures in the case.

Figure 1:
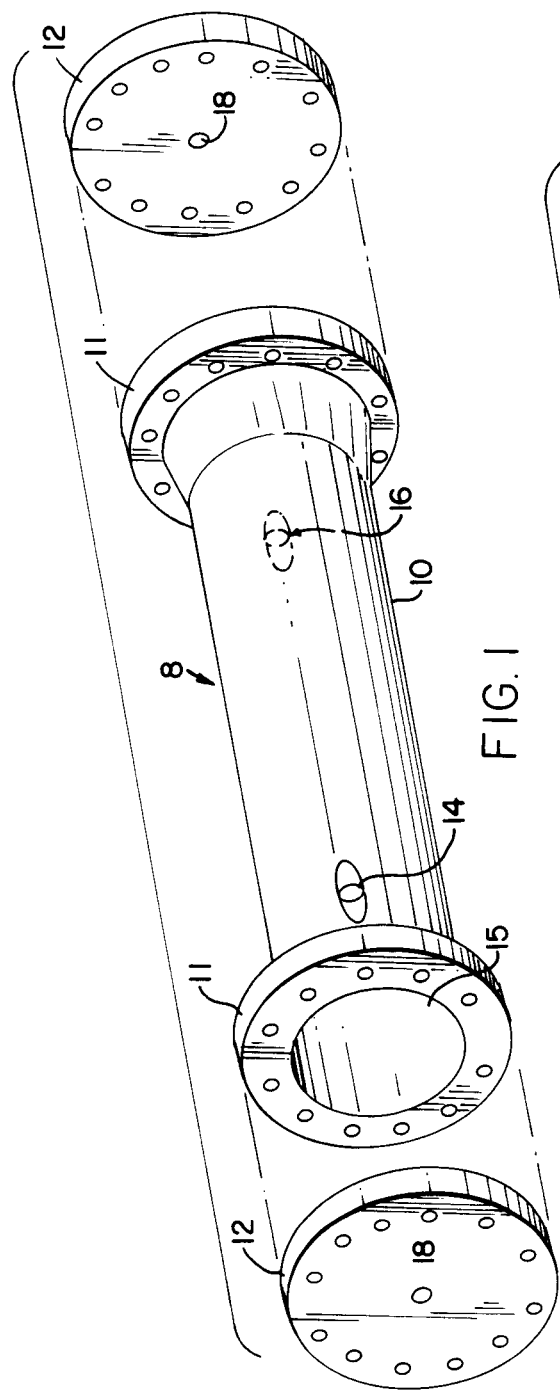
FIG. 1 is a side view of a particular assembly of the present invention showing the housing, the housing base, the flanges, and the feed inlet and concentrate outlet on the housing assembly and the permeate solution outlets on the flange assemblies.

As seen in FIG. 1, the total assembly 8 comprises a housing 10 with flanges 11 at each end with feed inlet 14 and retentate outlet 16. The housing is made of metal or other material, such as fiber glass reinforced epoxy, or reinforced carbon fibers, etc. capable of withstanding pressures in the range of 500 to 1000 psig and more and inert to the solution mixture to be separated. The ends of the housing are secured by blind flanges 12 which are fastened to the ends of the housing, thus creating a high pressure chamber compartment 15.

Figure 2:
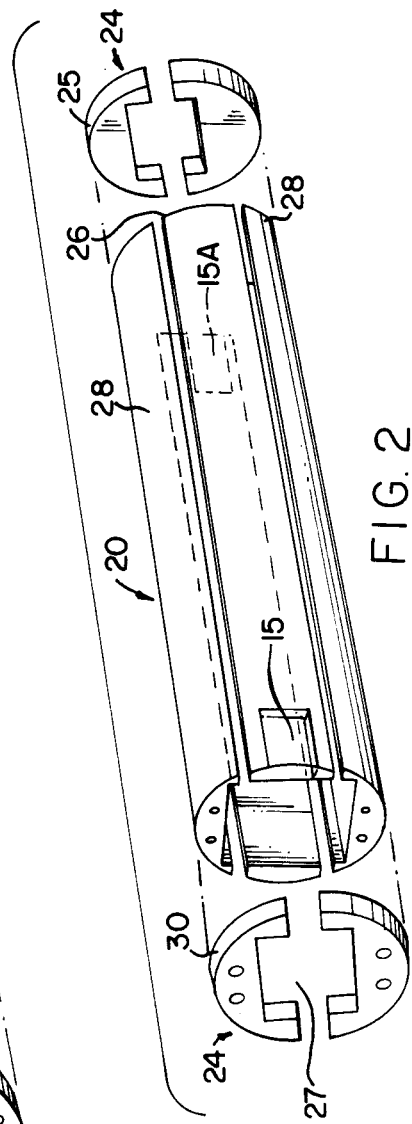
FIG. 2 is a side view of the high pressure module assembly illustrating the high pressure module side elements, and also showing the clamping cover assemblies which are mounted on each end of the high pressure compartment assembly.

The high pressure cartridge module assembly 20 which is depicted in FIG. 2 is comprised of 4 elements, the horizontal top and bottom elements 28 and the two vertical high pressure compartment side elements 26, although these four elements can be reduced in number by integrating two or more of the horizontal and vertical members into single units. These vertical and horizontal elements perform the function of maintaining the tubular membrane stacks in a flat, longitudinal configuration and of maintaining the relative position of the two end clamping devices 24 at each end of the cartridge. They also serve to channel the feed flow across the membrane surface. During insertion of the cartridge into housing 8 these vertical and horizontal elements serve to prevent the cartridge membrane stacks from being crushed or twisted during the insertion operation and they maintain the cartridge membranes in a preferred flat form. Side elements 26 are pierced by opening 15 and 15A, opening 15 (feed inlet) permitting entry of the solution into the module and thereby permitting contact with the membrane tubes, opening 15A (retentate outlet) permitting exit from the module of retentate produced after separation. These openings are in nominal register with the corresponding feed inlet and retentate outlet of the housing. These elements fit together to form a tubular module assembly having, after positioning, an interior space for accepting the membrane stack assembly 34 (as depicted in FIG. 6). The ends of the high pressure module assembly are fastened and secured by clamping cover assembly 24 to each end of assembly 20. Assembly 24 is comprised of clamping hemispheres 25 being top and bottom and being positioned to form square opening 27 surrounding the membrane stock assembly 34 at the edges. While housing 8 and cartridge module assembly 20 are depicted as circular in cross-section, it is understood that their cross-sectional profile may assume any shape, e.g., oval, square, polygonal, etc., depending upon the preference of the practitioner and the space requirements of each particular application. Such shape would require a multitude of flattened membranes of different flattened widths.

Further, while the opening 27 in assembly 24 is depicted as being square, this is not critical. The opening may also be, of course, rectangular, the size of the opening depending on the number of tubular membrane layers being stacked to form the overall membrane sandwich and the amount of flow entering or exiting therefrom. If only a few membrane layers are employed the height of the stack need not be equal to the width of the tubular membrane, thus the opening will be rectangular, being shorter in height (as measured across the membrane layers) and wider in width (as measured across the flattened membrane width). Alternatively, if a great plurality of membrane layers is employed the pipe cross-section can also be rectangular, but this time taller in height (across the stack) and narrower in width (across the flattened membrane width).

Further, if tubular membranes of different widths are employed a multiple layer sandwich of even circular or oval cross-section can be produced; in such an instance the opening (27) in assembly 24 may be circular or oval, as the case may be.

The significant design, however, employs a stack of membrane of square cross-section, assembly 24 being characterized by a square opening 27.

The tubular membranes and associated permeate and retentate spacers are layed flat in said module, sandwiched horizontally between the horizontal top and bottom elements 28.

Inside of the high pressure cartridge module assembly 20 is the membrane stack 34, as illustrated in FIG. 6, comprised of longitudinally flattened tubular membranes 36, as shown in one end of the compartment. Retentate spacers 40 are shown interspaced between the tubular membranes 36, however, not extending all the way to the ends of the tubes in clamp tube assembly 38 as fitted in said clamping assembly 24. The membrane assembly 35 as seen in FIG. 7 contains a flattened tube 36, being a semipermeable membrane having permeate spacer 42 inserted therein with the retentate spacer 40 on top and bottom. The clamped tubular assembly 38 is comprised of a number of these tubular arrangements, one on top of another, forming retentate spacer-to-membrane contact within the high pressure chamber. However, in the clamped tube assembly 38 membrane-to-membrane contact is established by virtue of the fact that retentate spacer 40 is not included between the membrane tubes. However, the permeate spacer 42 is extended the full length of the tube throughout the clamp assembly 38, thereby keeping the ends of each membrane tube open and, thus, allowing permeate to escape the membrane tube interior from the high pressure module 20, and through permeate outlet 18 for collection. Openings 15 in side wall element 26 permit entry of the solution mixture into the module along the edges of the membrane stack. These openings 15 may not extend any length of side wall element 26 which would thus reduce the exit flow velocity and create dead zones, but may take the form of numerous perforations in said side wall to facilitate contact of the feed solution with and along the edges of the tubular membrane stack.

Materials for the housing element and mechanical clamping elements of the module can be metal, plastic, or a molded resin.

Tubular membranes may be selected from regenerated cellulose, polyimide, polysulfone, polyurethane and other semipermeable membranes suitable for use in the permeation processes for which this apparatus is intended.

Permeate spacers are selected from Simplex TM, Tricot and are generally comprised of a stiffened dacron.

Retentate spacers are selected from Vexar TM or woven cloths which are compatible in the system (and are generally comprised of polyethylene/polypropylene material) but can be made of the higher-temperature-resistant materials, such as nylon, polysulphone, fiberglass, etc.

Sealant which can be used around the clamping assembly 24 to hold in the solution of the retentate around opening 27 during the permeation process can be epoxy or silicone sealant. If sufficient layers of membrane are used in the stack, mechanical clamping may be sufficient to form a fluid-tight seal without use of sealants.

The process of operating the membrane separation apparatus for solvent collection generally involves passing a feed under elevated pressure through the inlet port 14 on the housing 10 with the pressure driving the feed through opening 15 into the high pressure module 20 containing the membrane stack assembly 34. Because of the applied pressure, solvent from the feed permeates through the membrane and travels through the flattened tube 36 via permeate spacers 42 and through the clamping assembly 24 to collection outlet 18. The retentate travels under pressure through the high pressure module 20 and membrane stack assembly 34, through the feed spacers 40 and exits the module via opening 15(A) and leaves the assembly via the retentate outlet 16.

EXAMPLE OF THE OPERATION OF THE APPARATUS IN DEWAXING PROCESS

The following Example is illustrative of carrying out the best mode of the invention and should not be construed as being a limitation on the scope or spirit of the instant invention.

A sandwich of semipermeable membrane (regenerated cellulose, obtained from Spectrum Medical Industries, No. 32670 Vexar TM and Simplex TM of required length was layered into a square package as depicted in FIG. 6. This sandwich differs from the spiral wound sandwich is that a membrane tube is flattened, eliminating an edge seal. The end seal is made by clamping the membrane plus Simplex (no Vexar) sandwich in a mechanical seal to form membrane-to-membrane seals in the stack arrangement, but still allowing inner tubular space for permeate to exit via the permeate spacers from the tube end openings. If an edge gasket is required in the clamping assembly it can be made from a silicone or epoxy sealant and allowed to harden. Use of an edge gasket is preferred to avoid total reliance on mechanical pressure seals.

Assembly of the Membrane Unit

The membranes were assembled into a stack of 80 flattened tubular sheets using 40 tubes folded in half as described below complete with Simplex and Vexar spacers (see FIG. 6). The membrane tube which was 4" wide when flattened was cut into 6'6" lengths, folded in half and two 3'2" lengths of Simplex slid into each half of the membrane tube. A shorter length of Vexar 2'4" was laid between each folded membrane (See FIG. 7). The width of the Simplex was slightly smaller than 4", with the Vexar being 4", which is the same as the width of the flattened membrane tube.

This square membrane package was then clamped between the faces of a single end disc using two bolts through bolt holes 32 in clamp pieces 24 (see FIG. 4). A pressure seal was obtained by using a silicone sealant to fill the small space between the membrane edges and the end disc opening 27.

The four membrane protector plates, comprising horizontal and vertical elements 26 and 28, were then added, prior to insertion of the cartridge module into the pressure housing. A 6" diameter "O" ring was slipped into groove (A) in the circumference of end disc 24, see FIG. 5, and the whole package slid into the housing shown in FIG. 1. The assembly was recessed 2½" into the housing so that the package extends through the opposite end of the housing, thereby permitting one to attach the opposite end disc but no seal was needed since the membrane was used in a folded configuration. An "O" ring was also added to that end disc and the assembly centered in the housing so that the end discs were flush with the other flange face.

Membrane lengths at the open end extending through the end disc were trimmed so that when the blind flange was bolted onto the module with a gasket a pressure seal can be maintained.

The "O" ring at either end of the cartridge in the circumference of the end discs is to seal the high pressure feed retentate zone from the low pressure permeate zone.

Operation of the Unit

The feed enters the pipe at point 14 (see FIG. 1) and travels across each membrane surface (along the Vexar channels) to exit at point 16. The solvent, which permeates the tubular membrane, travels to either end of the package via the Simplex cloth to exit at point 18. The maximum length of the pipe (and membrane package) is determined by the pressure drop across the Simplex. A nominal length for Simplex, to give maximum permeate and minimum pressure drop, is 4', therefore, with 2 permeate exits a maximum membrane length of 8' could be achieved. The test unit was 38" long with provision for permeate exit at both ends. However, only one exit was used by employing membrane tubes folded over.

Test Results

The membrane used in each text was 100 mm (4") flat width regenerated cellulose tubing obtained from Spectrum. Its physical properties are shown in Table I, together with the flux results obtained in a laboratory flat plate, single membrane layer unit. These values will be used to compare those obtained by the test unit.

TABLE I

| MEMBRANE PROPERTIES | | | |
|---|---|---|---|
| Source: | Spectrum Medical Industries Regenerated Cellulose Tubing | | |
| Flat Width: | 100 mm (3.94") | | |
| M.W. Cutoff | 6000–8000 | | |
| Thickness | 66 microns | | |
| Flux (m$^3$/m$^2$/d) | 2858 kPa (400 psi) | 2858 kPa (800 psi) | 8370 kPa (1200 psi) |
| Water | 0.10 | 0.08 | — |
| Methanol | 0.096 | 0.09 | — |
| MEK | 0.218 | 0.22 (0.31) | 0.06 |

The design concept was evaluated in the first test. Only ten membrane envelopes complete with Vexar and Simplex were used to assemble the element. Several rubber strips were employed to occupy the unpacked volume.

The pressure seal was first evaluated using methanol at 1135 kPa (150 psi). As methanol is not permeable to the untreated membrane, testing for leaks was made easier. No permeate flux or any leaks were observed. See Table II.

Permeabilities of water, methanol and MEK were then determined at 1135 kPa and compared to those obtained in the laboratory at 2858 KpA, using unhindered flat sheet membrane. The predicted values for the test unit, when corrected to the high pressure, compared favorably with lab data. Selectivity data, using a feed solution of a deasphalted lube oil in MEK, gave 4.3% oil in permeate for a feed solution containing 20% MCT-30 lube oil in MEK solvent (hence 78.5% selectivity) which was as expected and, thus, confirmed the absence of leaks. Thus, a stable, leak free apparatus, suitable for reverse osmosis, had been demonstrated.

TABLE II

TEST 1

Membrane Area = 1.7548 m$^2$ (18.88 ft$^2$)
No. of Membrane Tubes = 10 (4" × 34")
Packing = 3 × 1" × 4" 36" rubber strips
Pressure Test - Methanol @ 150 psi - No flux Leaks

Flux (Sequentially Testing Water, MeOH and MEK)

_Water_
0.41 m$^3$/m$^2$/d (130 psi)
0.126 m$^3$/m$^2$/d (400 psi) calc'd

_MeOH_
0.043 m$^3$/m$^2$/d (130 psi)
0.132 m$^3$/m$^2$/d (400 psi) calc'd

_MEK_
0.052 m$^3$/m$^2$/d (130 psi)
0.16 m$^3$/m$^2$/d (400 psi) calc'd

_Selectivity_

Feed Solution Composition - 20% 600 N in MEK
Permeate Composition - 4.3% oil (130 psi operating pressure)
Selectivity = 78.5%
At Flux - 0.04 m$^3$/m$^2$/d (130 psi)

TABLE III

PROCESS FLOW REQUIRED FOR 6" DIAMETER ELEMENT
Total Area = 103.2 cm$^2$
Hydraulic Area = 103.2−41.2 = 62 cm$^2$

| Flow Rate Gals/Min | Velocity cm$^2$/S |
|---|---|
| 6.1 | 6 |
| 7.9 | 8 |
| 11.8 | 12 |

Best performance from the module for low viscosity systems will be obtained using stream velocities of 6 to 12 cm/S.

Process Flow

The optimum flow velocity for the square multi-leaf package is expected to be similar to that in a spiral wound configuration of 6–12 cm/s.

TABLE IV

PRESSURE VESSEL SIZES AND MEMBRANE AREAS OBTAINED FOR A MULTI-LEAF MODULE

| Membrane Thickness, Microns | Pressure Vessel Size (Inches, diameter) Packing Density (Sq. Feet per Cubic Foot) | Membrane Flat Width (in inches) Total Area in square ft. | Length In. |
|---|---|---|---|
| 66 | 6/270 | 4/151 | 34 |
| 17 (ENKA) | 6/340 | 4/190 | 34 |
| 66 | 6/270 | 4/906 | (20'*) |
| 66 | 8/270 | 5.6"/267 | 34 |
| 66 | 8/270 | 5.6"/1602 | (20'*) |
| 66 | 12/270 | 8.4"/600 | 34 |
| 66 | 12/270 | 8.4"/3604 | (20'*) |
| 66 | 16/270 | 11.2/1068 | 34 |
| 66 | 16/270 | 11.2/6409 | (20'*) |
| 66 | 20/270 | 14/1669 | 34 |
| 66 | 20/270 | 14/16104 | (20'*) |

*Uses 6 × 34" element

The six inch diameter prototype model could be scaled up for the large areas required in commercial applications. Examples of pipe, up to 20" in diameter and 20' in length, are tabulated in Table IV. Using a packing density as obtained using the 4" membrane of 270 ft$^2$/ft$^3$, a membrane area of 1500 m$^2$ (16,000 ft$^2$) can be obtained. However, using the ENKA membranes of 17 micron thickness, packing densities of 340 ft$^2$/ft$^3$ are expected.

What is claimed is:

1. A membrane separation apparatus for separating a feed mixture into a permeate stream and a retentate stream comprising:
    (a) a housing, having means for feed inlet, retentate outlet and permeate outlet;
    (b) a pressure resistant compartment, having feed inlet and retentate outlets in nominal register with the feed inlet and retentate outlet of the housing, disposed within said housing;
    (c) plurality of flattened tubular semipermeable membranes, arranged in a parallel stack arrangement, and separated individually by feed spacers which do not extend to the full length of the tubular membrane at each end longitudinally, each tubular membrane internally containing a permeate spacer extending the full length of said membrane tube and each flattened tube being open at both ends, the feed spacers and flattened tubes containing the permeate spacer being alternately longitudinally layered to form a stack disposed in said compartment;
    (d) clamping means to seal the membrane stack ends under pressure and to prevent the feed from exiting the compartment through the membrane envelope layers to the permeate side, the clamping means longitudinally positioning and maintaining the tubular membranes stack in the compartment by clamping tubular open ends in the arrangement forming membrane-to-membrane seals, such that during operation the permeate permeating through the membranes exits internally from the membrane envelope via the permeate spacer into the permeate outlet, while the retentate exits through the retentate outlet.

2. The apparatus of claim 1 wherein the pressure resistant compartment is capable of withstanding a high applied pressure.

3. The apparatus of claim 1 wherein the pressure is vacuum.

* * * * *